United States Patent
Chandra et al.

(10) Patent No.: US 9,602,796 B2
(45) Date of Patent: Mar. 21, 2017

(54) TECHNOLOGIES FOR IMPROVING THE ACCURACY OF DEPTH CAMERAS

(71) Applicant: Intel Corporation, Santa Clara, CA (US)

(72) Inventors: Rohan Chandra, Mississauga (CA); Abhishek Ranjan, Markham (CA); Shahzad A. Malik, Markham (CA)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/129,157

(22) PCT Filed: May 20, 2013

(86) PCT No.: PCT/US2013/041864
§ 371 (c)(1),
(2) Date: Dec. 24, 2013

(87) PCT Pub. No.: WO2014/189484
PCT Pub. Date: Nov. 27, 2014

(65) Prior Publication Data
US 2016/0065930 A1    Mar. 3, 2016

(51) Int. Cl.
*G06T 5/30* (2006.01)
*G06T 7/00* (2006.01)
(Continued)

(52) U.S. Cl.
CPC ......... *H04N 13/0007* (2013.01); *G06T 5/005* (2013.01); *G06T 5/30* (2013.01);
(Continued)

(58) Field of Classification Search
None
See application file for complete search history.

(56) References Cited

U.S. PATENT DOCUMENTS

| | | | | |
|---|---|---|---|---|
| 2010/0302395 | A1* | 12/2010 | Mathe | A63F 13/10 348/222.1 |
| 2011/0115886 | A1* | 5/2011 | Nguyen | H04N 13/025 348/47 |

(Continued)

FOREIGN PATENT DOCUMENTS

KR    1020120125492 A    11/2012

OTHER PUBLICATIONS

Oh, Kwan-Jung, Anthony Vetro, and Yo-Sung Ho. "Depth coding using a boundary reconstruction filter for 3-D video systems." Circuits and Systems for Video Technology, IEEE Transactions on 21.3 (2011): 350-359.*

(Continued)

*Primary Examiner* — Vikkram Bali
*Assistant Examiner* — Tracy Mangialaschi
(74) *Attorney, Agent, or Firm* — Barnes & Thornburg LLP (57) ABSTRACT

Technologies for improving the accuracy of depth camera images include a computing device to generate a foreground mask and a background mask for an image generated by a depth camera. The computing device identifies areas of a depth image of a depth channel of the generated image having unknown depth values as one of interior depth holes or exterior depth holes based on the foreground and background masks. The computing device fills at least a portion of the interior depth holes of the depth image based on depth values of areas of the depth image within a threshold distance of the corresponding portion of the interior depth holes. Similarly, the computing device fills at least a portion of the exterior depth holes of the depth image based on depth values of areas of the depth image within the threshold distance of the corresponding portion of the exterior depth holes.

22 Claims, 6 Drawing Sheets

(51) Int. Cl.
H04N 13/00 (2006.01)
G06T 5/00 (2006.01)
(52) U.S. Cl.
CPC ....... *G06T 7/0081* (2013.01); *H04N 13/0051* (2013.01); *G06T 2200/04* (2013.01); *G06T 2207/10028* (2013.01); *G06T 2207/20144* (2013.01); *G06T 2207/20148* (2013.01); *G06T 2207/30196* (2013.01)

(56) References Cited

U.S. PATENT DOCUMENTS

| | | | |
|---|---|---|---|
| 2011/0123113 A1* | 5/2011 | Berretty | G06T 5/005 382/173 |
| 2011/0261050 A1* | 10/2011 | Smolic | G06T 15/20 345/419 |
| 2012/0127267 A1 | 5/2012 | Zhang et al. | |
| 2012/0275689 A1 | 11/2012 | Birtwistle et al. | |
| 2012/0288184 A1 | 11/2012 | Zomet | |
| 2013/0063556 A1 | 3/2013 | Russell et al. | |

OTHER PUBLICATIONS

International Search Report and Written Opinion received for PCT Patent Application No. PCT/US2013/041864, mailed on Mar. 4, 2014, 11 pages.

Miao et al., "Texture-Assisted Kinect Depth Inpainting," in Proceedings of IEEE International Symposium on Circuits and Systems (ISCAS), May 2012, pp. 604-607.

Camplani et al., "Efficient Spatio-Temporal Hole Filling Strategy for Kinect Depth Maps," in Proceedings of SPIE 8290, Three-Dimensional Image Processing (3DIP) and Applications II, Feb. 9, 2012, 10 pages.

Des Bouvrie, "Improving RGBD Indoor Mapping with IMU data," Master's thesis, Delft University of Technology, 2011, 66 pages.

Shotton et al., "Real-Time Human Pose Recognition in Parts from Single Depth Images," in Proceedings of IEEE Conference on Computer Vision and Pattern Recognition (CVPR), 2011, 8 pages.

Hervieu et al., "Stereoscopic Image Inpainting: Distinct Depth Maps and Images Inpainting," in Proceedings of IEEE International Conference on Pattern Recognition (ICPR), 2010, pp. 4101-4104.

Kopf et al., "Joint Bilateral Upsampling," in ACM Transactions on Graphics (Proceedings of SIGGRAPH 2007), vol. 26, No. 3, 2007, 5 pages.

Tomasi et al., "Bilateral Filtering for Gray and Color Images," in Proceedings of IEEE International Conference on Computer Vision (ICCV), 1998, pp. 839-846.

Fua, "A Parallel Stereo Algorithm that Produces Dense Depth Maps and Preserves Image Features," in Machine Vision and Applications, vol. 6, No. 1, 1993, pp. 35-49.

Teh et al., "On the Detection of Dominant Points on Digital Curves," in IEEE Transactions on Pattern Analysis and Machine Intelligence (PAMI), vol. 11, Issue 8, 1989, pp. 859-872.

Wikipedia.org, "Sobel operator," Wikipedia, the Free Encyclopedia, retrieved from: <http://en.wikipedia.org/w/index.php?title=Sobel_operator&oldid=587530877>, edited Dec. 24, 2013, 6 pages.

* cited by examiner

TECHNOLOGIES FOR IMPROVING THE ACCURACY OF DEPTH CAMERAS

CROSS REFERENCE TO RELATED APPLICATIONS

This application is a national stage entry under 35 USC §371(b) of International Application No. PCT/US2013/041864, which was filed May 20, 2013.

BACKGROUND

Depth cameras are used in a multitude of applications to capture three-dimensional information using, for example, multiple lenses or infrared sensors. The particular applications of depth cameras range from gesture-based interfaces (e.g., on a video game system) to robot navigation. The depth channel or stream output by the depth camera indicates the distance of an object captured in the scene relative to the camera. However, there are numerous cases in which a depth camera is unable to determine the precise depth measurements of certain points within the scene. This may be due to a variety of factors including, for example, occlusions, infrared frequency absorption of an object in the scene, signal noise, and/or distance from the depth camera. These common scenarios result in depth images (i.e., a depth channel or depth stream) having holes and poorly defined object boundaries. Busy environments further amplify the potential number and size of depth holes in depth image.

Although in some applications the depth holes are generally not a concern (e.g., in video games), in other applications an accurate depth image is critical to functionality (e.g., robot navigation). Accordingly, numerous algorithms have been developed in an attempt to remedy such deficiencies of depth cameras. For example, various signal and image processing filters have been leveraged to smooth out noise and fill depth holes. Due to the large number of images processed in a video stream, a balance must be struck between the accuracy and efficiency of the corrected depth camera image.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
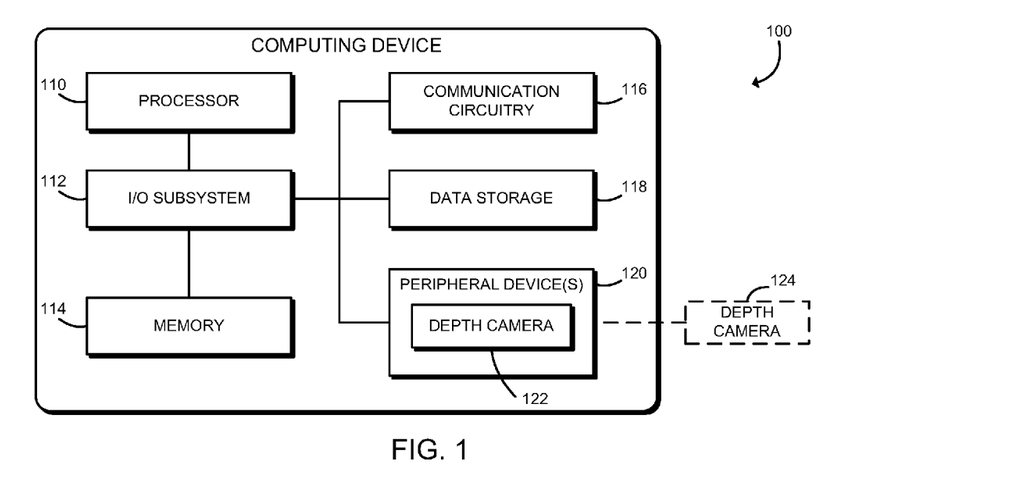
FIG. 1 is a simplified block diagram of at least one embodiment of a computing device for improving the accuracy of depth camera images.

Referring now to FIG. 1, in the illustrative embodiment, a computing device 100 for improving the accuracy of depth camera images is configured to fill, correct, reduce, or otherwise modify unknown depth values (i.e., depth holes) in a depth image. As discussed in detail below, by filling the depth holes, the accuracy of the depth image may be substantially improved. The computing device 100 may be embodied as any type of computing device 100 capable of improving the accuracy of depth camera images and performing the functions described herein. For example, the computing device 100 may be embodied as a cellular phone, smartphone, tablet computer, laptop computer, personal digital assistant, mobile Internet device, desktop computer, server, gaming system, and/or any other computing/communication device. As shown in FIG. 1, the illustrative computing device 100 includes a processor 110, an input/output ("I/O") subsystem 112, a memory 114, a communication circuitry 116, a data storage 118, and one or more peripheral devices 120. Of course, the computing device 100 may include other or additional components, such as those commonly found in a typical computing device (e.g., various input/output devices), in other embodiments. Additionally, in some embodiments, one or more of the illustrative components may be incorporated in, or otherwise from a portion of, another component. For example, the memory 114, or portions thereof, may be incorporated in the processor 110 in some embodiments.

The processor 110 may be embodied as any type of processor capable of performing the functions described herein. For example, the processor may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the computing device 100 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the computing device 100. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the computing device 100, on a single integrated circuit chip.

The communication circuitry 116 of the computing device 100 may be embodied as any communication circuit, device, or collection thereof, capable of enabling communications between the computing device 100 and other remote devices (e.g., in a cloud computing environment) over a network. The communication circuitry 116 may be configured to use any one or more communication technologies (e.g., wireless or wired communications) and associated protocols (e.g., Ethernet, Bluetooth®, Wi-Fi®, WiMAX, etc.) to effect such communication. Further, the network may be embodied as any type of telecommunication network capable of facilitating communication between the computing device 100 and remote devices. As such, the network may include one or more networks, routers, switches, computers, and/or other intervening devices. For example, the network may be embodied as or otherwise include one or more cellular networks, telephone networks, local or wide area networks, publicly available global networks (e.g., the Internet), an ad hoc network, or any combination thereof. For example, in one embodiment, image depth data may be offloaded to the computing device 100 by a client computing device for analysis and reduction of the depth holes. In such an embodiment, the computing device 100 may transmit corrected or otherwise modified image depth data back to the client computing device post-analysis.

Figure 7:
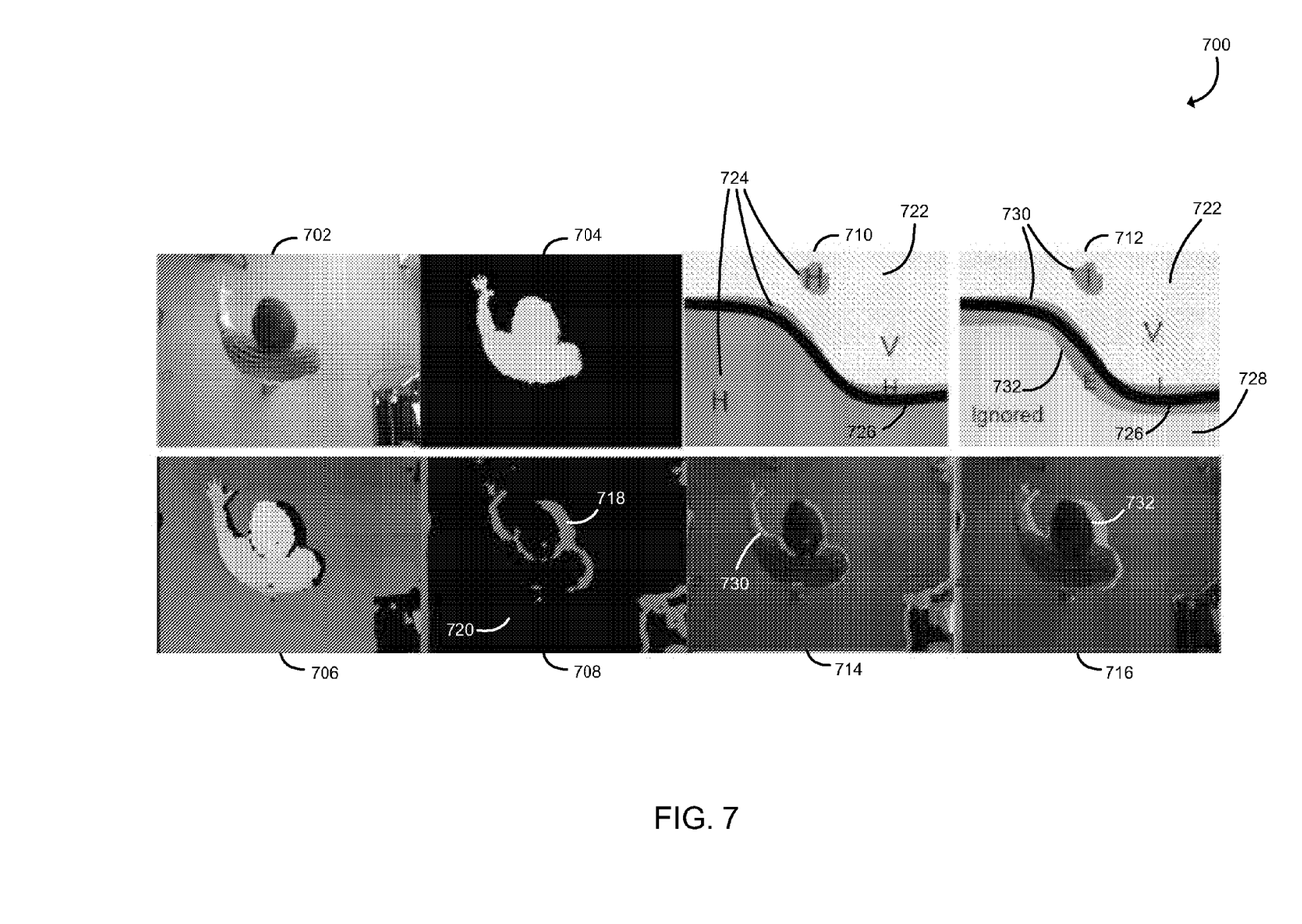
FIG. 7 is a set of images generated by the computing device of FIG. 1 based on the method for improving the accuracy of depth camera images of FIG. 3.

The data storage 118 may be embodied as any type of device or devices configured for short-term or long-term storage of data such as, for example, memory devices and circuits, memory cards, hard disk drives, solid-state drives, or other data storage devices. The one or more peripheral devices 120 of the computing device 100 may include any number of additional peripheral or interface devices. The particular devices included in the peripheral devices 120 may depend on, for example, the type and/or intended use of the computing device 100. As shown in FIG. 1, the illustrative peripheral devices 120 include a depth camera 122 for capturing images and/or video, which may be used by the computing device 100 to capture depth images. The depth camera 122 is also configured to capture color images in the illustrative embodiment. For example, the depth camera 122 may have a RGBD (red-green-blue-depth) sensor or a similar camera sensor that may capture images having four channels—a depth channel and three color channels (i.e., non-depth channels). In other words, the depth camera 122 may have an RGB color stream and a depth stream. Of course, the color values of the image may be represented in another way (e.g., as grayscale). In some embodiments, the RGB image color values may instead be represented as HSL (hue-saturation-lightness) or HSV (hue-saturation-value) values. Further, the computing device 100 may have a depth camera 122 having a sensor configured to capture color images and another sensor configured to capture depth. For simplicity, references herein to an "RGB image" and/or a "color image" refer to an image based on the color/grayscale channels (e.g., from the RBG stream) of a particular image, whereas references to a "depth image" refer to a corresponding image based on only the depth channel/stream of the same image. For example, the depth camera 122 may capture a grayscale RGBD image including a corresponding RGB image 702 and depth image 706 as shown in FIG. 7.

It should be appreciated that the depth camera 122 may determine depth measurements of objects in a scene in a variety of ways depending on the particular depth camera 122 used. For example, the depth camera 122 may include an infrared (IR) projector and an IR sensor such that the IR sensor estimates depth values of objects in the scene by analyzing the IR light pattern projected on the scene by the IR projector. In another embodiment, the depth camera 122 includes at least two lenses and corresponding sensors configured to capture images from at least two different viewpoints of a scene (e.g., a stereo camera). Based on those viewpoints, the computing device 100 may calculate a distance of objects in the captured scene. The depth camera 122 may be unable to accurately capture the depth of certain objects in the scene due to a variety of factors (e.g., occlusions, IR absorption, noise, and distance). As such, there may be depth holes (i.e., unknown depth values) in the captured depth image/channel, which may be indicated as such with a corresponding depth pixel value (e.g., zero or null). Of course, the particular value or symbol representing an unknown depth pixel value in the depth image may vary based on the particular implementation. As discussed above, in some embodiments, the computing device 100 may analyze depth images received from a remote depth camera 124 rather than, or in addition to, the "local" depth camera 122.

Figure 2:
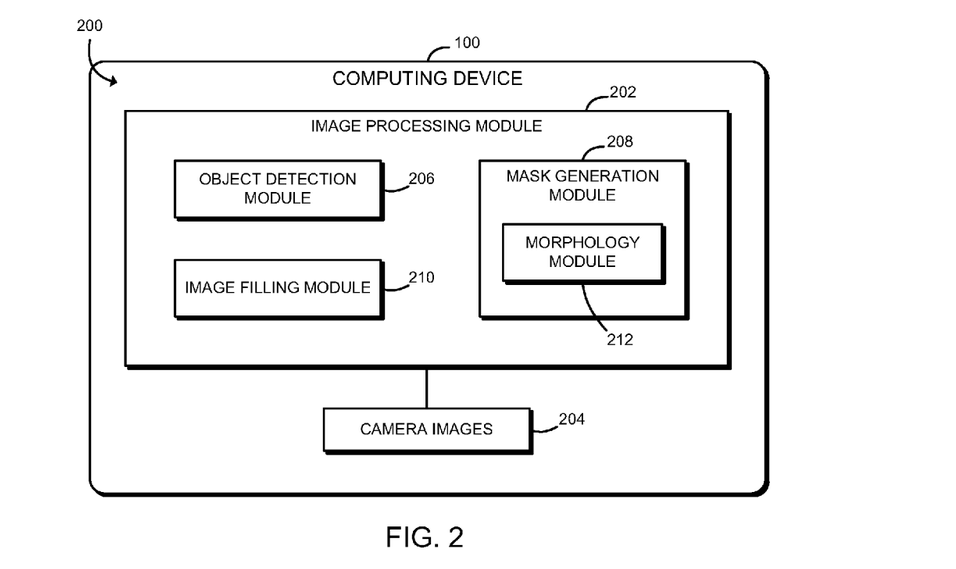
FIG. 2 is a simplified block diagram of at least one embodiment of an environment of the computing device of FIG. 1.

Referring now to FIG. 2, in use, the computing device 100 establishes an environment 200 for improving the accuracy of depth camera images. The environment 200 in the illustrative embodiment includes an image processing module 202 and camera images 204. Additionally, the image processing module 202 includes an object detection module 206, a mask generation module 208, and an image filling module 210. Further, the mask generation module 208 includes a morphology module 212. Each of the image processing module 202, the object detection module 206, the mask generation module 208, the image filling module 210, and the morphology module 212 may be embodied as hardware, software, firmware, or a combination thereof.

As discussed in more detail below, the image processing module 202 receives the camera images 204 from the depth camera 122 (e.g., as streamed video). The image processing module 202 may analyze each of the camera images 204 (e.g., each frame of a streamed video or a subset thereof) and reduce the number of depth holes in the images 204. In doing so, the image processing module 202 identifies various characteristics of the images 204. For example, the image processing module 202 may determine whether there are any depth holes in the images 204. If there are no depth holes in a particular image 204, the image processing module 202 may move on to the next image 204 to be analyzed (e.g., the next frame of the video stream). However, if there are depth holes in the image 204, the image processing module 202 eliminates or reduces the number of those depth holes by finding foreground objects in the RGB stream, separating foreground and background holes in the depth stream, and filling the holes in the depth stream as discussed in greater detail below.

The object detection module 206 identifies objects in the scene (e.g., in the foreground) of the image 204 and may utilize any suitable object detection algorithm for doing so. As discussed below, the object detection module 206 may utilize edge detection filters and/or algorithms to identify the boundaries of the objects in the RGB stream. For example, the object detection module 206 may utilize image gradient operator(s) (e.g., separable Sobel filters), a Canny edge detector, and/or other edge detection algorithms. In another embodiment, the object detection module 206 may additionally, or alternatively, utilize one or more suitable image segmentation algorithms for identifying the objects in the scene (e.g., pyramid segmentation).

The mask generation module 208 generates various image masks (e.g., binary masks) for use in reducing the number of depth holes in the depth channel of the images 204. As discussed in detail below, the mask generation module 208 may generate, for example, foreground masks, background masks, masks associated with separating interior depth holes from exterior depth holes, and/or other image masks. In doing so, the mask generation module 208 may use any suitable technologies, algorithms, or other mechanisms for selecting the portion(s) of the images 204 in which to mask for a particular purpose. For example, the mask generation module 208 may flood-fill objects bounded by the edges identified by the object detection module 206 and create a binary mask for the objects. In other words, the mask generation module 208 generates a mask that ignores non-object pixels of the image 204 so that one or more subsequent processes may be directed only to the pixels associated with the objects. In one embodiment, the masked pixels in the binary mask are high-valued (e.g., having a value of one) and the unmasked pixels are low-valued (e.g., having a value of zero).

The generation of certain image masks may involve the use of one or more morphological operators. Accordingly, the morphology module 212 may perform various morphological operations (e.g., dilation, erosion, opening, closing, morphological gradient, white top-hat transformation, black top-hat transformation, and other morphological operations). In the illustrative embodiment, the mask generation module 208 creates a binary mask including all valid depth pixels. In such an embodiment, the morphology module 212 may perform a dilation operation on the binary mask to expand the mask (e.g., outward) into the unmasked, and therefore zero-valued, regions. As discussed below, the expanded mask may be used to reduce the set of depth holes under consideration by the image processing module 202, which significantly reduces the computational overhead on the computing device 100.

The image filling module 210 fills identified depth holes/pixels based on nearby depth values (i.e., known depth values of pixels in the same "neighborhood" or within a threshold distance). In doing so, the image filling module 210 selects a weighting function, filter, and/or various parameters. For example, in one embodiment, the image filling module 210 may use a zero-mean Gaussian filter having a 5×5 convolution kernel size. In other words, the Gaussian filter has a 5×5 pixel neighborhood centered on the depth pixel of interest. As discussed below, in some embodiments, the image filling module 210 may ignore one or more pixel values (e.g., other unknown depth values) in a depth pixel's neighborhood.

Figure 3:
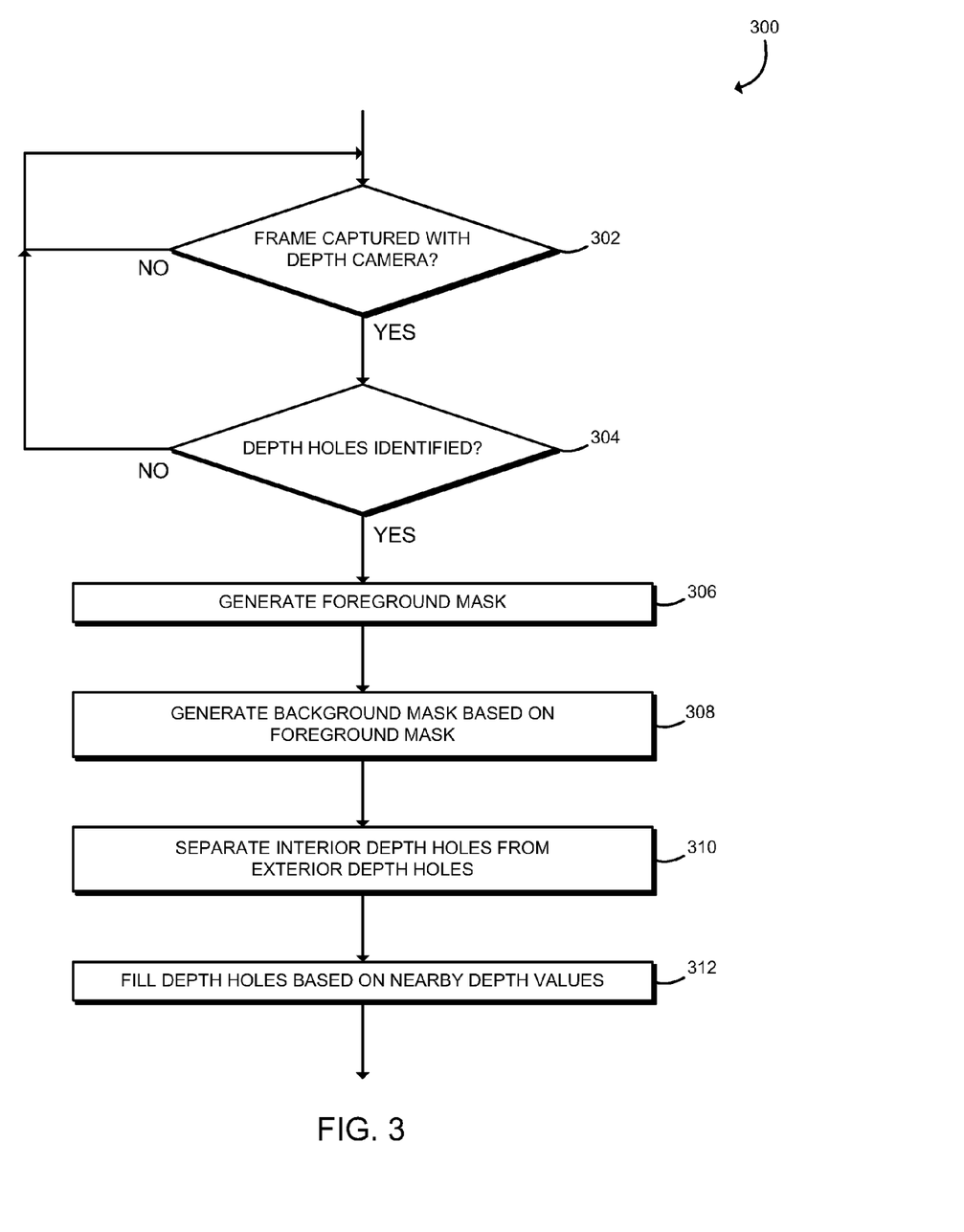
FIG. 3 is a simplified flow diagram of at least one embodiment of a method for improving the accuracy of depth camera images on the computing device of FIG. 1.

Referring now to FIG. 3, in use, the computing device 100 may execute a method 300 for improving the accuracy of the depth camera images. The illustrative method 300 begins with block 302 in which the computing device 100 determines whether a frame has been captured by the depth camera 122. As discussed above, the depth camera 122 may provide a depth stream in addition to a standard RGB (e.g., color or grayscale) video stream. Each captured frame of the video stream or a portion of captured frames (e.g., every third frame) may be analyzed by the computing device 100. In another embodiment, the computing device 100 analyzes independent images rather than a set of images from a video.

If a frame has been captured, in block 304, the computing device 100 determines whether any depth holes have been identified. In other words, the computing device 100 determines whether any depth values in the image are unknown. As discussed above, the depth camera 122 may be unable to determine a precise depth measurement of certain points in the scene (i.e., certain pixels of the image) for a variety of reasons. For example, an object in the image may be occluded from the depth camera 122. In embodiments in which an IR sensor is used for determining depth, IR frequency absorption may cause problems. Specifically, objects in the scene may absorb certain IR frequencies used by the IR projector, which results in no usable information being available to the IR sensor regarding depth. In yet another embodiment, significant amounts of noise may occur, for example, on surfaces approximately perpendicular to the depth camera 122. Further, objects at a distance exceeding the maximum detectable distance of the IR sensor may result in unknown depth values.

Figure 4:
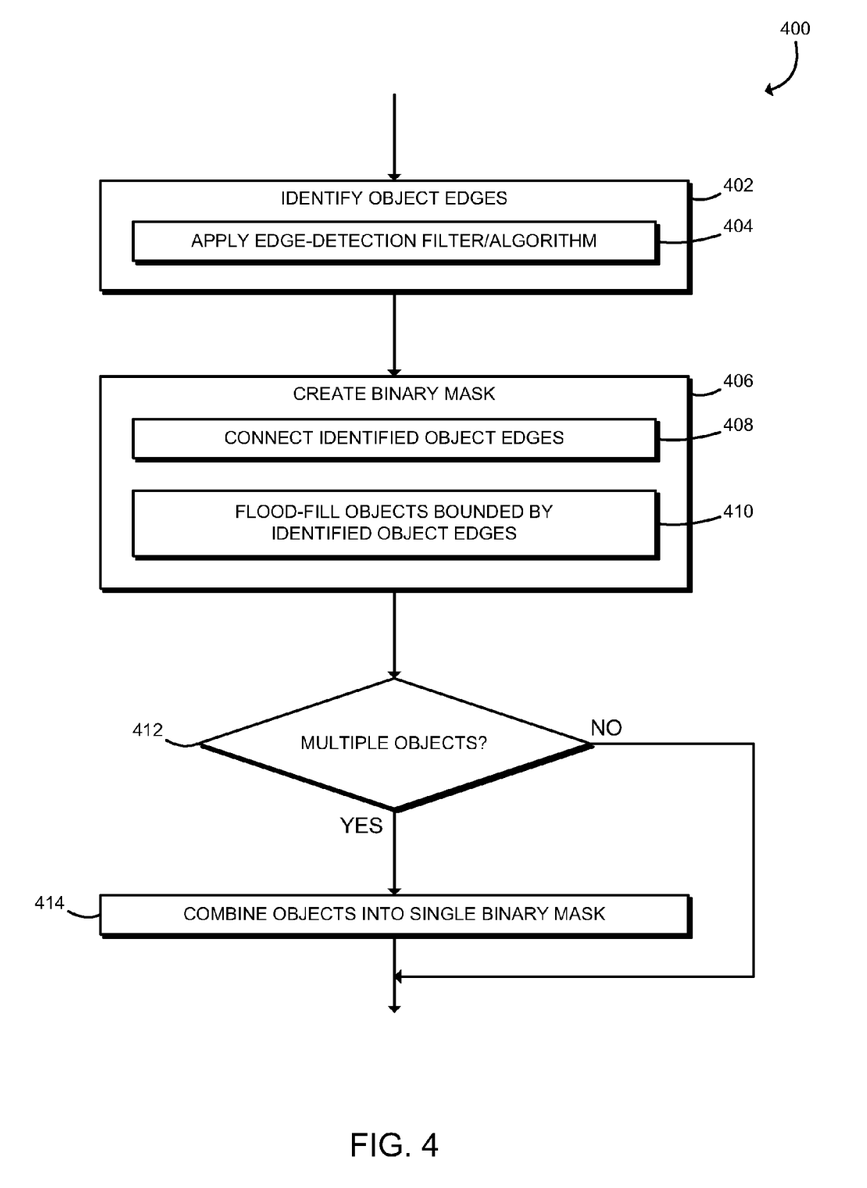
FIG. 4 is a simplified flow diagram of at least one embodiment of a method for generating a foreground mask on the computing device of FIG. 1.

If no depth holes have been identified, the method 300 returns to block 302 in which the computing device 100 determines whether another frame has been captured by the depth camera 122 (e.g., the next frame in a video stream). However, if depth holes have been identified, the computing device 100 generates a foreground mask in block 306. To do so, the computing device 100 may execute a method 400 as shown in FIG. 4. That is, the computing device generates a mask including all objects in the foreground of the image (see, e.g., an image 704 of FIG. 7).

The illustrative method 400 begins with block 402 in which the computing device 100 identifies object edges in the image/frame. In doing so, the computing device 100 may apply an edge detection filter or algorithm to the image in block 404. Specifically, the computing device 100 identifies the edges of objects in a frame of the RGB stream; the corresponding frame of the depth stream is ignored. It should be appreciated that the computing device 100 may utilize any suitable combination of edge detection filter(s) and/or edge detection algorithm(s) to identify the edges of the objects. For example, the computing device 100 may convolve the RGB image with a separable Sobel filter. In another embodiment, the computing device 100 may identify the edges using, for example, Canny edge detection algorithms or other edge detection algorithms.

In block 406, the computing device 100 creates a binary mask for each detected object. To do so, the computing device 100 may connect the identified object edges in block 408. For example, in an embodiment in which a separable Sobel filter or another other edge detection filter is used, the pixels having a low-valued response to the convolution may be thresholded or otherwise filtered out. In other words, the weak edges are filtered out, leaving the strong edges, which likely corresponding to boundaries of the objects. The computing device 100 may use a connected components algorithm to connect the remaining edges of each object in the image. In block 410, the computing device 100 flood-fills (e.g., inward) the objects bounded by the identified object edges. By flood-filling the bounded edges, a binary mask is created for each object in the scene. Of course, the computing device 100 may utilize other means of estimating the boundaries of the objects in the scene (e.g., more sophisticated edge detection) and/or identifying and masking the objects (e.g., an image segmentation algorithm).

In block 412, the computing device 100 determines whether there are multiple flood-filled objects (i.e., independent objects) in the image. If so, the computing device 100 generates a composite binary mask (i.e., the foreground mask) including each of those flood-filled objects (e.g., by adding or otherwise combining each of the corresponding individual object masks) in block 414. However, if there is only one flood-filled object in the image, the foreground mask is the binary mask corresponding to that object.

Figure 5:
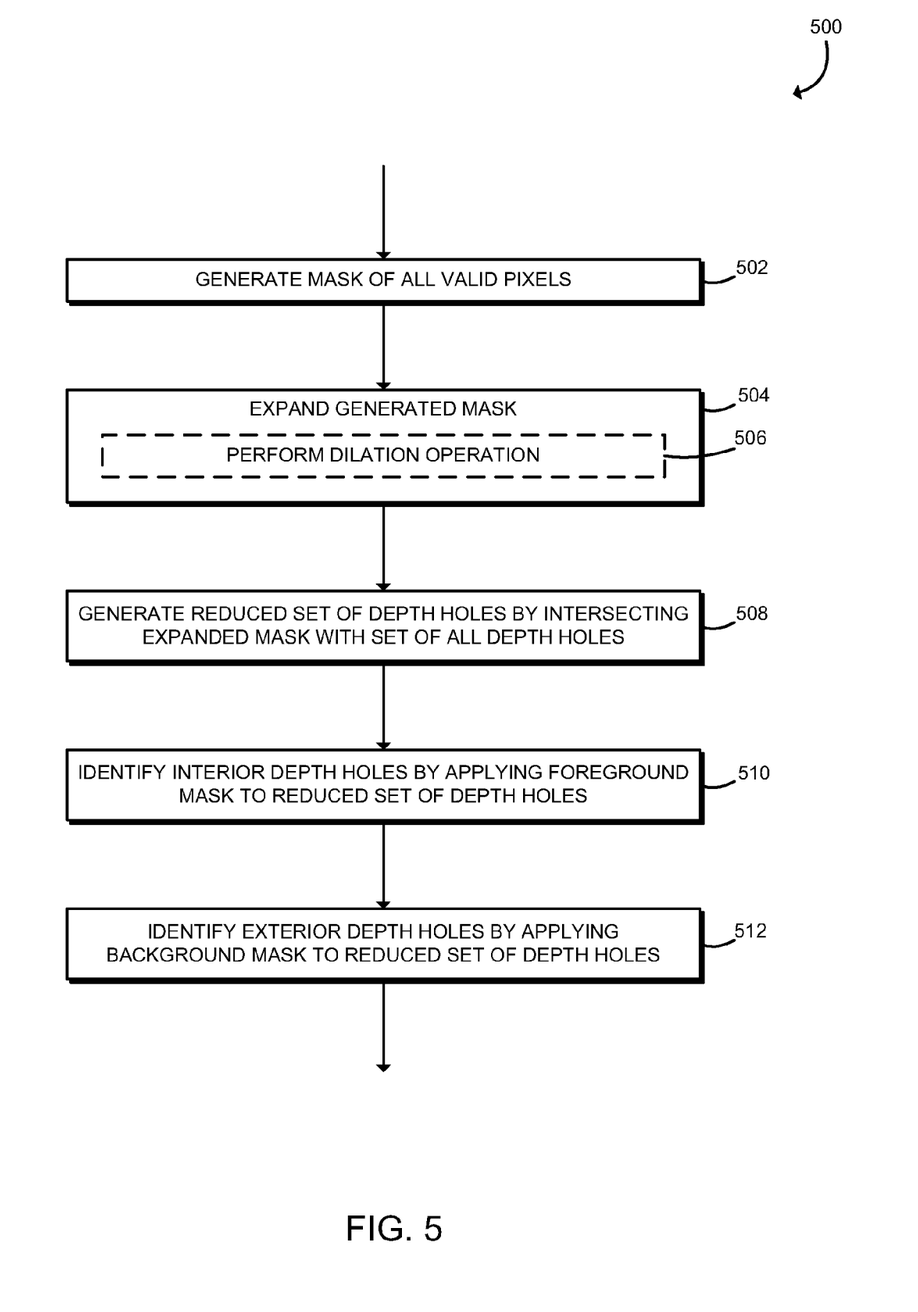
FIG. 5 is a simplified flow diagram of at least one embodiment of a method for separating interior depth holes from exterior depth holes on the computing device of FIG. 1.

Referring back to FIG. 3, based on the foreground mask, the computing device 100 generates the background mask in block 308. In the illustrative embodiment, the background mask includes all pixels not included in the foreground mask. Accordingly, in some embodiments, the background mask and the foreground mask have no common pixels. In block 310, the computing device 100 separates the interior depth holes from the exterior depth holes in the depth image. To do so, the computing device 100 may execute a method 500 as shown in FIG. 5 in which the computing device 100 identifies the interior depth holes and exterior depth holes based on a reduced set of depth holes. It should be appreciated that depth holes do not typically consist of a single unknown depth pixel. Rather, the depth holes are oftentimes defined by a contiguous region or portion of the depth image having unknown depth values. Regions in the background often create large depth holes with no reliable depth values in the neighborhood, whereas depth holes in the foreground tend to be smaller and have nearby reliable depth values. When the depth difference between a foreground object and the background in great, the depth holes around the boundary of the foreground object overlap with the depth holes of the background, which makes it difficult to separate the two types of depth holes. Accordingly, the method 500 separates the large exterior holes from the relatively smaller interior holes.

The illustrative method 500 begins with block 502 in which the computing device 100 generates a binary mask of all valid depth pixels in the depth image. As indicated above, the depth camera 122 may assign a particular value to a pixel if the depth value for that particular pixel is unknown. For example, the depth camera 122 might assign a value of zero for unknown depths and nonzero values for known depths. As such, the computing device 100 may distinguish between those pixels having valid depth values and those having invalid/unknown depth values (e.g., depth holes). For example, an image 708 of FIG. 7 illustratively shows regions 718 of unknown depth values (i.e., depth holes) and regions 720 of valid depth values of the corresponding depth image 706.

In block 504, the computing device 100 expands the generated valid pixel mask. In doing so, the computing device 100 may, for example, perform a morphological dilation operation on the valid pixel mask in block 504. It should be appreciated that the valid pixel mask in the illustrative embodiment is a binary mask. That is, the valid depth pixels in the mask are assigned a value of one, whereas the invalid or unknown depth pixels are assigned a value of zero. Accordingly, the dilation operation expands the valid pixel mask outward, because the valid depth pixels have greater values (i.e., one) than the unknown depth pixels (i.e., zero). In some embodiments, dilation of the mask may be applied uniformly to the image (e.g., if all foreground objects are of roughly the same size), whereas in other embodiments, varying levels of dilation may be performed on different segments or portions of the mask. The amount of dilation may depend, for example, on the size of the objects in the image and may be predetermined or determined dynamically by the computing device 100. For example, in one embodiment, a dilation of approximately one-tenth of the object's pixel area is used.

In block 508, the computing device 100 generates a reduced set of depth holes by intersecting the expanded valid pixel mask with the set of all depth holes. That is, depth pixels common to the expanded valid pixel mask and the set of unknown depth pixels remain, whereas the others are filtered out. After the intersection operation, regions of unknown depth pixels having a thickness corresponding to the amount of expansion (e.g., from dilation) surrounding the objects and all of the unknown depth pixels at the interior of the objects remain. However, the unknown depth pixels in background outside the regions of unknown depth pixels surrounding the objects are filtered out and ignored. As discussed below, in some embodiments, the reduced set of depth holes will be analyzed by the computing device 100 to determine whether they may be filled rather than analyzing all of the depth holes in the depth image.

Once the reduced set of depth holes for which the computing device 100 will attempt to fill are identified, the unknown depth pixels inside an object are separated from those unknown depth pixels outside the objects. In block 510, the computing device 100 identifies the interior depth holes by applying the foreground mask (see block 306 of FIG. 3) to the reduced set of depth holes. In block 512, the computing device 100 identifies the exterior depth holes by applying the background mask (see block 308 of FIG. 3) to the reduced set of depth holes. In each of blocks 510, 512, the computing device 100 may, for example, intersect the corresponding binary mask (i.e., foreground or background) with the reduced set of depth holes.

Referring now to FIG. 7, in order to separate the interior depth holes from the exterior depth holes, the computing device 100 may analyze the depth image to identify regions 722 of valid depth pixels and regions 724 of unknown depth pixels (i.e., depth holes) and to identify a border 726 between the foreground and the background in the RGB image as shown in image 710. After generating a valid pixel mask based on the regions 722, the computing device 100 expands (e.g., via dilation) the mask and intersects the expanded mask with the set of depth holes defined by the regions 724 to generate a reduced set of depth holes as discussed above. In other words, a portion 728 of the depth holes are ignored. Armed with the reduced set of depth holes, the computing device 100 identifies the interior depth holes 730 and the exterior depth holes 732 as illustratively shown in images 712, 714, 716.

Referring back to FIG. 3, the computing device 100 fills the interior depth holes and the exterior depth holes based on nearby depth values in block 312. In some embodiments, the computing device 100 may use a suitable "inpainting" method to fill each of the interior unknown depth value region (i.e., the region(s) defined by the interior depth holes) and the exterior unknown depth value region (i.e., the region(s) defined by the exterior depth holes). For example, the computing device 100 may, for each unknown region, iteratively "trace" the outer boundary of the region and attempt to fill each depth pixel on that boundary based on its neighboring pixel values to fill as many unknown depth pixels as possible. As discussed below, independently filling the interior and exterior regions preserve strong edges during the filling process by ensuring that depth pixels near an object's boundary are only filled with other pixels from the same object and not with pixels from beyond the object's boundaries. It also prevents the filling from overextending by creating a limit on how far the filling process can extend the filled background or object boundary, which results in depth values more accurately reflecting the objects' true depth values. It should further be appreciated that by establishing the interior and exterior regions prior to filling, the structure of the RGB image is implicitly determined, thereby rendering it unnecessary to perform additional pixel comparisons to the RGB image while filling the depth holes.

Figure 6:
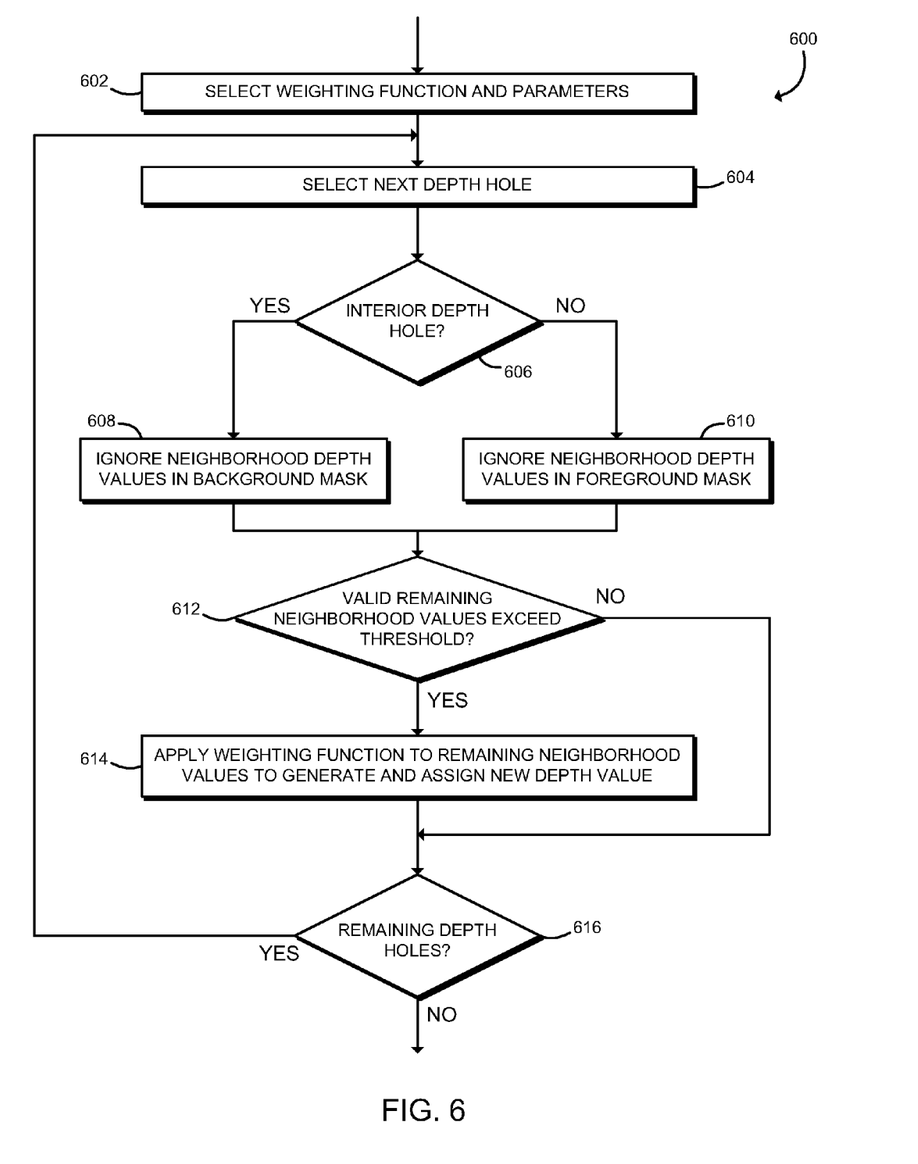
FIG. 6 is a simplified flow diagram of at least one embodiment of a method for filling depth holes based on nearby depth values on the computing device of FIG. 1.

In the illustrative embodiment, the computing device 100 may execute a method 600 as shown in FIG. 6 in which the computing device 100 separately fills the interior and exterior depth holes using a selected weighting function and various parameters (e.g., kernel size/shape, thresholds, weighting coefficients, etc.). The illustrative method 600 begins with block 602 in which the computing device 100 selects a weighting function and parameters to use for filling the depth holes. For example, the computing device 100 may fill a pixel passed on the weighted average of its valid neighbors using a 5×5 rectangular filter kernel/neighborhood.

In block 604, the computing device 100 selects the next interior or exterior depth hole (i.e., unknown depth pixel) to be filled. Of course, during the first iteration of block 604, the computing device 100 may select any interior or exterior depth hole. On subsequent iterations, the computing device 100 selects a depth hole for which the computing device 100 has not yet addressed (i.e., filled or determined that it cannot be filled). In block 606, the computing device 100 determines whether the selected depth hole is an interior depth hole. If so, in block 608, the computing device 100 ignores neighborhood depth values of pixels in the background mask (see block 308 of FIG. 3). In other words, depth values for pixels corresponding to objects in the background of the RGB image are ignored in calculations of a new depth value for the selected pixel. However, if the computing device 100 determines that the selected depth hole is an exterior depth hole, the computing device 100 ignores neighborhood depth values of pixels in the foreground mask in block 610. That is, depth values for pixels corresponding to objects in the foreground of the RGB image are ignored in calculations of a new depth value for the selected pixel.

In block 612, the computing device 100 determines whether the remaining valid neighborhood depth values exceed a threshold. That is, the computing device 100 determines whether a threshold is exceeded or otherwise surpassed based on the depth values of pixels in the neighborhood of the selected depth hole that have not been ignored (i.e., in blocks 608, 610) and that have valid depth values (i.e., are not depth holes themselves). For example, the weighting function may be used to determine whether those neighborhood depth values surpass a weight threshold (e.g., minimum weight) for the neighborhood of the selected depth hole to be considered valid. If the threshold is surpassed (i.e., satisfied), the computing device applies the weighting function to those remaining valid neighborhood depth values to generate and assign a new depth value to the selected depth hole in block 614. In block 616, the computing device 100 determines whether any depth holes remain to be analyzed. If so, the method 600 returns to block 604 in which the computing device 100 selects the next depth hole. Returning to block 612, if the threshold is not surpassed, the computing device 100 advances to block 616 in which the computing device 100 determines whether any depth holes remain to be analyzed. In other words, for each interior and exterior depth hole, the computing device 100 either generates a new depth value or determines that a new depth value cannot be generated and maintains an unknown depth value.

In at least one implementation of the method 600, the computing device 100 selects a weighting function, $W_{ij}$, having a limited support function, $f(i,j)$, such that for each pixel $i \in I$ and j in the neighborhood of i, $$W_{ij} = \begin{cases} 0, & \text{if } j \notin F \text{ or } j \in H \\ f(i,j), & \text{otherwise} \end{cases} \quad (1)$$

where I is defined as the set of interior depth holes, F is defined as the foreground mask, and H is defined as the set of all depth holes. Similarly, for each pixel $i \in E$ and j in the neighborhood of i, $$W_{ij} = \begin{cases} 0, & \text{if } j \notin B \text{ or } j \in H \\ f(i,j), & \text{otherwise} \end{cases} \quad (2)$$

where E is defined as the set of exterior depth holes and B is defined as the background mask. The function, $f(i,j)$, may be a limited support function on pixels i and j such as the Euclidean distance between i and j. The weighting is computed by the computing device 100 as a zero mean Gaussian over the Manhattan distance between the pixel positions of i and j for each pixel j in the neighborhood (e.g., based on a 5×5 kernel) around i. The threshold discussed above (see block 612 of FIG. 6) is defined in this embodiment as $\Sigma W_{ij} > k$ for some threshold value, k. In other words, the selected depth hole, i, is only to be filled by a new depth value if there are enough valid neighbors around the selected depth pixel, where k represents the minimal weight threshold for the neighborhood to be considered valid for the selected depth pixel. The threshold value may be predetermined or dynamically selected by the computing device 100 depending on the embodiment. If the threshold is satisfied, the computing device 100 calculates the new depth value, D(i), for the selected depth hole as $$D(i) = \frac{\sum_i W_{ij} \cdot D(j)}{\sum_j W_{ij}}. \quad (3)$$

However, as discussed above, if the threshold is not satisfied, the computing device 100 does not calculate and assign a new depth value to the depth hole. Rather, the unknown depth value is maintained for that depth pixel. It should be appreciated that, in other embodiments, other suitable weighting functions, parameters, and thresholds may be used to generate new depth values for the depth holes.

EXAMPLES

Illustrative examples of the technologies disclosed herein are provided below. An embodiment of the technologies may include any one or more, and any combination of, the examples described below.

Example 1 includes a computing device for improving the accuracy of depth camera images, the computing device comprising a mask generation module to (i) generate a foreground mask for an image generated by a depth camera, wherein the generated image includes a depth channel and the foreground mask includes at least one foreground object of the generated image, (ii) generate a background mask for the generated image, wherein the background mask includes portions of the generated image other than the at least one foreground object, and (iii) identify areas of a depth image of the depth channel of the generated image having unknown depth values as one of interior depth holes or exterior depth holes based on the foreground mask and the background mask; and an image filling module to (i) fill at least a portion of the interior depth holes of the depth image based on depth values of areas of the depth image within a threshold distance of the corresponding portion of the interior depth holes and (ii) fill at least a portion of the exterior depth holes of the depth image based on depth values of areas of the depth image within the threshold distance of the corresponding portion of the exterior depth holes.

Example 2 includes the subject matter of Example 1, and wherein to generate the foreground mask comprises to identify edges of the at least one foreground object; and generate a binary mask of the at least one objects based on the identified edges.

Example 3 includes the subject matter of any of Examples 1 and 2, and wherein to identify the edges of the at least one foreground object comprises to apply an edge detection filter to the generated image.

Example 4 includes the subject matter of any of Examples 1-3, and wherein to apply the edge detection filter comprises to apply a separable Sobel filter to the generated image.

Example 5 includes the subject matter of any of Examples 1-4, and wherein to generate the binary mask comprises to connect the identified edges of the at least one foreground object to identify boundaries of the at least one foreground object; and flood-fill the at least one bounded foreground object.

Example 6 includes the subject matter of any of Examples 1-5, and wherein to identify the boundaries of the at least one foreground object comprises to convolve the edge detection filter with the generated image; and filter out low-valued pixels of a corresponding image response.

Example 7 includes the subject matter of any of Examples 1-6, and wherein to generate the binary mask comprises to combine binary masks of each of the at least one foreground object.

Example 8 includes the subject matter of any of Examples 1-7, and wherein to identify the areas of the depth image as one of interior depth holes or exterior depth holes comprises to generate a binary mask including all known depth values; expand the generated binary mask; intersect the expanded binary mask with a set of all of the unknown depth values to generate a reduced set of unknown depth values; apply the foreground mask to the reduced set of unknown depth values to identify the interior depth holes; and apply the background mask to the reduced set of unknown depth values to identify the exterior depth holes.

Example 9 includes the subject matter of any of Examples 1-8, and wherein to expand the generated binary mask comprises to perform a dilation operation.

Example 10 includes the subject matter of any of Examples 1-9, and wherein to fill at least the portion of the interior depth holes and to fill at least the portion of the exterior depth holes comprises to apply a weighting function to a neighborhood of each of the interior depth holes and each of the exterior depth holes, the weighting function having a convolution kernel size defining the threshold and the neighborhood.

Example 11 includes the subject matter of any of Examples 1-10, and wherein to fill at least the portion of the interior depth holes comprises to apply the weighting function to the neighborhood of each of the interior depth holes, such that the weighting function ignores (i) unknown depth values in the neighborhood and (ii) exterior depth holes; and wherein to fill at least the portion of the exterior depth holes comprises to apply the weighting function to the neighborhood of each of the exterior depth holes, such that the weighting function ignores (i) unknown depth values in the neighborhood and (ii) interior depth holes.

Example 12 includes the subject matter of any of Examples 1-11, and wherein to fill at least the portion of the interior depth holes and to fill at least the portion of the exterior depth holes comprises to leave unfilled a depth hole having a smaller weighting function value than a threshold number.

Example 13 includes a method for improving the accuracy of depth camera images on a computing device, the method comprising generating, on the computing device, a foreground mask for an image generated by a depth camera, the generated image including a depth channel and the foreground mask including at least one foreground object of the generated image; generating, on the computing device, a background mask for the generated image, the background mask including portions of the generated image other than the at least one foreground object; identifying, on the computing device, areas of a depth image of the depth channel of the generated image having unknown depth values as one of interior depth holes or exterior depth holes based on the foreground mask and the background mask; filling, on the computing device, at least a portion of the interior depth holes of the depth image based on depth values of areas of the depth image within a threshold distance of the corresponding portion of the interior depth holes; and filling, on the computing device, at least a portion of the exterior depth holes of the depth image based on depth values of areas of the depth image within the threshold distance of the corresponding portion of the exterior depth holes.

Example 14 includes the subject matter of Example 13, and wherein generating the foreground mask comprises identifying edges of the at least one foreground object; and generating a binary mask of the at least one objects based on the identified edges.

Example 15 includes the subject matter of any of Examples 13 and 14, and wherein identifying the edges of the at least one foreground object comprises applying an edge detection filter to the generated image.

Example 16 includes the subject matter of any of Examples 13-15, and wherein applying the edge detection filter comprises applying a separable Sobel filter to the generated image.

Example 17 includes the subject matter of any of Examples 13-16, and wherein generating the binary mask comprises connecting the identified edges of the at least one foreground object to identify boundaries of the at least one foreground object; and flood-filling the at least one bounded foreground object.

Example 18 includes the subject matter of any of Examples 13-17, and wherein identifying the boundaries of the at least one foreground object comprises convolving the edge detection filter with the generated image; and filtering out low-valued pixels of a corresponding image response.

Example 19 includes the subject matter of any of Examples 13-18, and wherein generating the binary mask comprises combining binary masks of each of the at least one foreground object.

Example 20 includes the subject matter of any of Examples 13-19, and wherein identifying the areas of the depth image as one of interior depth holes or exterior depth holes comprises generating a binary mask including all known depth values; expanding the generated binary mask; intersecting the expanded binary mask with a set of all of the unknown depth values to generate a reduced set of unknown depth values; applying the foreground mask to the reduced set of unknown depth values to identify the interior depth holes; and applying the background mask to the reduced set of unknown depth values to identify the exterior depth holes.

Example 21 includes the subject matter of any of Examples 13-20, and wherein expanding the generated binary mask comprises performing a dilation operation.

Example 22 includes the subject matter of any of Examples 13-21, and wherein filling at least the portion of the interior depth holes and filling at least the portion of the exterior depth holes comprises applying a weighting function to a neighborhood of each of the interior depth holes and each of the exterior depth holes, the weighting function having a convolution kernel size defining the threshold and the neighborhood.

Example 23 includes the subject matter of any of Examples 13-22, and wherein filling at least the portion of the interior depth holes comprises applying the weighting function to the neighborhood of each of the interior depth holes, such that the weighting function ignores (i) unknown depth values in the neighborhood and (ii) exterior depth holes; and wherein filling at least the portion of the exterior depth holes comprises applying the weighting function to the neighborhood of each of the exterior depth holes, such that the weighting function ignores (i) unknown depth values in the neighborhood and (ii) interior depth holes.

Example 24 includes the subject matter of any of Examples 13-23, and wherein filling at least the portion of the interior depth holes and filling at least the portion of the exterior depth holes comprises leaving unfilled a depth hole having a smaller weighting function value than a threshold number.

Example 25 includes a computing device comprising a processor; and a memory having stored therein a plurality of instructions that when executed by the processor cause the computing device to perform the method of any of Examples 13-24.

Example 26 includes one or more machine readable storage media comprising a plurality of instructions stored thereon that in response to being executed result in a computing device performing the method of any of Examples 13-24.

Example 27 includes a computing device for improving the accuracy of depth camera images, the computing device comprising means for generating a foreground mask for an image generated by a depth camera, the generated image including a depth channel and the foreground mask including at least one foreground object of the generated image; means for generating a background mask for the generated image, the background mask including portions of the generated image other than the at least one foreground object; means for identifying areas of a depth image of the depth channel of the generated image having unknown depth values as one of interior depth holes or exterior depth holes based on the foreground mask and the background mask; means for filling at least a portion of the interior depth holes of the depth image based on depth values of areas of the depth image within a threshold distance of the corresponding portion of the interior depth holes; and means for filling at least a portion of the exterior depth holes of the depth image based on depth values of areas of the depth image within the threshold distance of the corresponding portion of the exterior depth holes.

Example 28 includes the subject matter of Example 27, and wherein the means for generating the foreground mask comprises means for identifying edges of the at least one foreground object; and means for generating a binary mask of the at least one objects based on the identified edges.

Example 29 includes the subject matter of any of Examples 27 and 28, and wherein the means for identifying the edges of the at least one foreground object comprises means for applying an edge detection filter to the generated image.

Example 30 includes the subject matter of any of Examples 27-29, and wherein the means for applying the edge detection filter comprises means for applying a separable Sobel filter to the generated image.

Example 31 includes the subject matter of any of Examples 27-30, and wherein the means for generating the binary mask comprises means for connecting the identified edges of the at least one foreground object to identify boundaries of the at least one foreground object; and means for flood-filling the at least one bounded foreground object.

Example 32 includes the subject matter of any of Examples 27-31, and wherein the means for identifying the boundaries of the at least one foreground object comprises means for convolving the edge detection filter with the generated image; and means for filtering out low-valued pixels of a corresponding image response.

Example 33 includes the subject matter of any of Examples 27-32, and wherein the means for generating the binary mask comprises means for combining binary masks of each of the at least one foreground object.

Example 34 includes the subject matter of any of Examples 27-33, and wherein the means for identifying the areas of the depth image as one of interior depth holes or exterior depth holes comprises means for generating a binary mask including all known depth values; means for expanding the generated binary mask; means for intersecting the expanded binary mask with a set of all of the unknown depth values to generate a reduced set of unknown depth values; means for applying the foreground mask to the reduced set of unknown depth values to identify the interior depth holes; and means for applying the background mask to the reduced set of unknown depth values to identify the exterior depth holes.

Example 35 includes the subject matter of any of Examples 27-34, and wherein the means for expanding the generated binary mask comprises means for performing a dilation operation.

Example 36 includes the subject matter of any of Examples 27-35, and wherein the means for filling at least the portion of the interior depth holes and filling at least the portion of the exterior depth holes comprises means for applying a weighting function to a neighborhood of each of the interior depth holes and each of the exterior depth holes, the weighting function having a convolution kernel size defining the threshold and the neighborhood.

Example 37 includes the subject matter of any of Examples 27-36, and wherein the means for filling at least the portion of the interior depth holes comprises means for applying the weighting function to the neighborhood of each of the interior depth holes, such that the weighting function ignores (i) unknown depth values in the neighborhood and (ii) exterior depth holes; and wherein the means for filling at least the portion of the exterior depth holes comprises means for applying the weighting function to the neighborhood of each of the exterior depth holes, such that the weighting function ignores (i) unknown depth values in the neighborhood and (ii) interior depth holes.

Example 38 includes the subject matter of any of Examples 27-37, and wherein the means for filling at least the portion of the interior depth holes and filling at least the portion of the exterior depth holes comprises means for leaving unfilled a depth hole having a smaller weighting function value than a threshold number.

The invention claimed is:

1. A computing device for improving the accuracy of depth camera images, the computing device comprising:
a processor; and
a memory having stored therein:
a mask generation module to (i) generate a foreground mask for an image generated by a depth camera, wherein the generated image includes a depth channel and the foreground mask includes at least one foreground object of the generated image, (ii) generate a background mask for the generated image, wherein the background mask includes portions of the generated image other than the at least one foreground object, (iii) generate a binary mask including a first plurality of pixels, each pixel of the first plurality of pixels having a corresponding known depth value, (iv) expand the generated binary mask, (v), intersect the expanded binary mask with a second plurality of pixels to generate a reduced plurality of pixels, each pixel of the second plurality of pixels and the reduced plurality of pixels having an unknown depth value, (vi) apply the foreground mask to the reduced plurality of pixels to identify interior depth holes, and (vii) apply the background mask to the reduced plurality of pixels to identify exterior depth holes; and an image filling module to (i) fill at least a portion of the interior depth holes of the depth image based on depth values of areas of the depth image within a threshold distance of the corresponding portion of the interior depth holes and (ii) fill at least a portion of the exterior depth holes of the depth image based on depth values of areas of the depth image within the threshold distance of the corresponding portion of the exterior depth holes.

2. The computing device of claim 1, wherein to generate the foreground mask comprises to:
identify edges of the at least one foreground object; and
generate a second binary mask of the at least one object based on the identified edges.

3. The computing device of claim 2, wherein to identify the edges of the at least one foreground object comprises to apply an edge detection filter to the generated image.

4. The computing device of claim 3, wherein to apply the edge detection filter comprises to apply a separable Sobel filter to the generated image.

5. The computing device of claim 3, wherein to generate the second binary mask comprises to:
connect the identified edges of the at least one foreground object to identify boundaries of the at least one foreground object; and
flood-fill the at least one bounded foreground object.

6. The computing device of claim 5, wherein to identify the boundaries of the at least one foreground object comprises to:
convolve the edge detection filter with the generated image; and
filter out low-valued pixels of a corresponding image response.

7. The computing device of claim 1, wherein to expand the generated binary mask comprises to perform a dilation operation.

8. The computing device of claim 1, wherein to fill at least the portion of the interior depth holes and to fill at least the portion of the exterior depth holes comprises to apply a weighting function to a neighborhood of each of the interior depth holes and each of the exterior depth holes, the weighting function having a convolution kernel size defining the threshold and the neighborhood.

9. The computing device of claim 8, wherein to fill at least the portion of the interior depth holes comprises to apply the weighting function to the neighborhood of each of the interior depth holes, such that the weighting function ignores (i) unknown depth values in the neighborhood and (ii) exterior depth holes; and
wherein to fill at least the portion of the exterior depth holes comprises to apply the weighting function to the neighborhood of each of the exterior depth holes, such that the weighting function ignores (i) unknown depth values in the neighborhood and (ii) interior depth holes.

10. The computing device of claim 9, wherein to fill at least the portion of the interior depth holes and to fill at least the portion of the exterior depth holes comprises to leave unfilled a depth hole having a smaller weighting function value than a threshold number.

11. One or more non-transitory machine readable storage media comprising a plurality of instructions stored thereon that, in response to execution by a computing device, cause the computing device to:
generate a foreground mask for an image generated by a depth camera, the generated image including a depth channel and the foreground mask including at least one foreground object of the generated image;

generate a background mask for the generated image, the background mask including portions of the generated image other than the at least one foreground object;
generate a binary mask including a first plurality of pixels, each pixel of the first plurality of pixels having a corresponding known depth value;
expand the generated binary mask;
intersect the expanded binary mask with a second plurality of pixels to generate a reduced plurality of pixels, each pixel of the second plurality of pixels and the reduced plurality of pixels having an unknown depth value;
apply the foreground mask to the reduced plurality of pixels to identify interior depth holes;
apply the background mask to the reduced plurality of pixels to identify exterior depth holes;
fill at least a portion of the interior depth holes of the depth image based on depth values of areas of the depth image within a threshold distance of the corresponding portion of the interior depth holes; and
fill at least a portion of the exterior depth holes of the depth image based on depth values of areas of the depth image within the threshold distance of the corresponding portion of the exterior depth holes.

12. The one or more non-transitory machine readable storage media of claim 11, wherein to generate the foreground mask comprises to:
identify edges of the at least one foreground object; and
generate a second binary mask of the at least one object based on the identified edges.

13. The one or more non-transitory machine readable storage media of claim 12, wherein identifying the edges of the at least one foreground object comprises applying an edge detection filter to the generated image.

14. The one or more non-transitory machine readable storage media of claim 13, wherein to generate the second binary mask comprises to:
connect the identified edges of the at least one foreground object to identify boundaries of the at least one foreground object; and
flood-fill the at least one bounded foreground object.

15. The one or more non-transitory machine readable storage media of claim 14, wherein to identify the boundaries of the at least one foreground object comprises to:
convolve the edge detection filter with the generated image; and
filter out low-valued pixels of a corresponding image response.

16. The one or more non-transitory machine readable storage media of claim 11, wherein to expand the generated binary mask comprises to perform a dilation operation.

17. The one or more non-transitory machine readable storage media of claim 11, wherein to fill at least the portion of the interior depth holes and to fill at least the portion of the exterior depth holes comprises to apply a weighting function to a neighborhood of each of the interior depth holes and each of the exterior depth holes, the weighting function having a convolution kernel size defining the threshold and the neighborhood.

18. The one or more non-transitory machine readable storage media of claim 17, wherein to fill at least the portion of the interior depth holes comprises to apply the weighting function to the neighborhood of each of the interior depth holes, such that the weighting function ignores (i) unknown depth values in the neighborhood and (ii) exterior depth holes; and wherein to fill at least the portion of the exterior depth holes comprises to apply the weighting function to the neighborhood of each of the exterior depth holes, such that the weighting function ignores (i) unknown depth values in the neighborhood and (ii) interior depth holes.

19. The one or more non-transitory machine readable storage media of claim 18, wherein to fill at least the portion of the interior depth holes and to fill at least the portion of the exterior depth holes comprises to leave unfilled a depth hole having a smaller weighting function value than a threshold number.

20. A method for improving the accuracy of depth camera images on a computing device, the method comprising:
generating, on the computing device, a foreground mask for an image generated by a depth camera, the generated image including a depth channel and the foreground mask including at least one foreground object of the generated image;
generating, on the computing device, a background mask for the generated image, the background mask including portions of the generated image other than the at least one foreground object;
generating, on the computing device, a binary mask including a first plurality of pixels, each pixel of the first plurality of pixels having a corresponding known depth value;
expanding, on the computing device, the generated binary mask;
intersecting, on the computing device, the expanded binary mask with a second plurality of pixels to generate a reduced plurality of pixels, each pixel of the second plurality of pixels and the reduced plurality of pixels having an unknown depth value;
applying, on the computing device, the foreground mask to the reduced plurality of pixels to identify interior depth holes;
applying, on the computing device, the background mask to the reduced plurality of pixels to identify exterior depth holes;
filling, on the computing device, at least a portion of the interior depth holes of the depth image based on depth values of areas of the depth image within a threshold distance of the corresponding portion of the interior depth holes; and
filling, on the computing device, at least a portion of the exterior depth holes of the depth image based on depth values of areas of the depth image within the threshold distance of the corresponding portion of the exterior depth holes.

21. The method of claim 20, wherein generating the foreground mask comprises:
identifying edges of the at least one foreground object by applying an edge detection filter to the generated image; and
generating a second binary mask of the at least one object based on the identified edges by (i) connecting the identified edges of the at least one foreground object to identify boundaries of the at least one foreground object and (ii) flood-filling the at least one bounded foreground object.

22. The method of claim 20, wherein filling at least the portion of the interior depth holes and filling at least the portion of the exterior depth holes comprises applying a weighting function to a neighborhood of each of the interior depth holes and each of the exterior depth holes, the weighting function having a convolution kernel size defining the threshold and the neighborhood.

* * * * *